(12) United States Patent
Megiddo et al.

(10) Patent No.: US 7,158,992 B2
(45) Date of Patent: Jan. 2, 2007

(54) METHOD FOR COMPARATIVE VISUAL RENDERING OF DATA

(75) Inventors: Eran Megiddo, Bellevue, WA (US); Yoram Meriaz, Holon (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/807,938

(22) Filed: Mar. 23, 2004

(65) Prior Publication Data

US 2004/0181507 A1 Sep. 16, 2004

Related U.S. Application Data

(63) Continuation of application No. 09/711,873, filed on Nov. 13, 2000, now Pat. No. 6,728,724, which is a continuation of application No. PCT/IL99/00261, filed on May 17, 1999.

(60) Provisional application No. 60/085,781, filed on May 18, 1998.

(51) Int. Cl.
*G06F 17/30* (2006.01)

(52) U.S. Cl. ...................... 707/102; 707/101

(58) Field of Classification Search ............ 707/3, 707/4, 5, 10, 102, 104.1, 101; 345/428, 440, 345/764, 782, 805, 840, 848; 715/500; 717/105
See application file for complete search history.

(56) References Cited

U.S. PATENT DOCUMENTS 5,767,854 A * 6/1998 Anwar .................. 715/848
6,728,724 B1 * 4/2004 Megiddo et al. ........... 707/102

FOREIGN PATENT DOCUMENTS

| EP | 0 558 223 | | 9/1993 |
|---|---|---|---|
| EP | 558223 A1 | * | 9/1993 |
| WO | WO 92/06425 | | 4/1992 |

OTHER PUBLICATIONS

"Color Scales for Image Data" Levkowitz, et al. IEEE Computer Graphics & Applications, Jan. 1992, pp. 72-80.
"Visualization and Analysis of Multi-variate Data: A Technique for All Fields" Mihalisin, et al. 1991.
"Visualization Support for Data Mining" Lee, et al. XP000639605, Data Mining, Oct. 1996, pp. 69-75.
"VisDB: Database Exploration Using Multidimensional Visualization" Keim, et al. 1994, pp. 40-49.

* cited by examiner

*Primary Examiner*—Apu M. Mofiz
(74) *Attorney, Agent, or Firm*—Microsoft Corporation (57) ABSTRACT

Method for the interactive graphical presentation of multi-dimensional data to a user. Data is extracted from multidimensional database, in which it is arranged and stored according to predetermined attributes, representing different measures for each dimension. A data processing means having user interface is coupled to the database, so as to extract data for presentation. Upon receiving a request for presentation from the user, data which is relevant to the request is extracted from the corresponding dimension(s) in the database, processed by the processing means and displayed in two or more separate windows linked to each other. Each window corresponds to a single dimension and contains colored bars or other means of representation for comparative presentation of the data related to this single dimension.

12 Claims, 3 Drawing Sheets

(PRIOR ART)

METHOD FOR COMPARATIVE VISUAL RENDERING OF DATA

CROSS-REFERENCE TO RELATED APPLICATIONS

The present application is a continuation of U.S. application Ser. No. 09/711,873 filed on Nov. 13, 2000, now U.S. Pat. No. 6,728,724 which is a continuation of International Application Ser. No. PCT/IL99/00261 filed on May 17, 1999, which claims the benefit and priority of U.S. Provisional Application No. 60/085,781 filed on May 18, 1998, all of which are incorporated herein by reference thereto in their entirety, as though fully set forth herein.

BACKGROUND OF THE INVENTION

1. Field of the Invention

The present invention relates to the field of data processing. More particularly, the invention relates to a method and system for multi-dimensional rendering of data, by providing the user with a dynamic interface to the data, using the simultaneous display of several dimensions and continuous colors for comparative measurements.

2. Description of Related Art

Many modern organizations accumulate large amounts of information, which is stored in commercial database systems which are available in the market, or in custom designed data warehouses. Computers are used to access the databases and retrieve data, and/or to add and store new data. Databases have been at the back-end of most legacy systems. Each such system had it's own front end user application. Data was normally dispersed in numerous legacy system databases, and therefore, the entire data could not be accessed as a whole. Data warehouses were created to access all relevant data. Data warehouse collect data from various legacy systems into a centralized repository, allowing queries on the entire data stored by the organization.

On-Line Analytical Processing (OLAP) server technology was developed to enable quick querying of the data. OLAP servers utilize special algorithms to store aggregated and consolidated data in a way that rapidly provides answers to multidimensional queries, allowing for essential on-line analysis of the data. Available OLAP client software connects users to OLAP servers through proprietary or open interfaces. Data is retrieved using user queries, and is then processed and presented to the user. The user actually serves as the front-end interface to the stored data, through which investigation and analysis are performed.

OLAP became a widespread and powerful tool, for allowing users to identify and better understand trends and events which mostly influence their businesses, as well as problematic key points. OLAP provides the user with intuitive tools for viewing and analyzing data. However, current technology for the presentation of data taken from OLAP databases lacks the capability of simultaneously rendering data from multidimensional aspects and several measurements, and therefore limits the user's capability, whenever fast analysis and understanding of complex data is desired. Moreover, OLAP technology lacks simple visual parameters, which rapidly direct the user to main key-points and allow him to obtain inferences related to massive raw data.

Excel (to Microsoft corporation Redmond Wash., USA) is a spreadsheet software, in which data can be presented in two or three dimensional graphs, or as tables. However, presentation of multidimensional data requires many such two or three-dimensional graphs, which are complex and cumbersome for analysis and presentation of the linkage between different dimensions.

All the prior art methods have not yet provided satisfactory solutions to the problem of providing the user with means to interactively analyze multidimensional data in an intuitive way.

It is an object of the present invention to provide a method and system for the on-line analysis of multidimensional data.

It is another object of the invention to provide means efficiently outlining to the user key data points out of a multidimensional data field containing up to very large amount of data points.

It is a further object of the invention to provide means for carrying out a multi-layered parametric investigation.

Other objects and advantages of the invention will become apparent as the description proceeds.

SUMMARY OF THE INVENTION

In the description to follow, the following terms have the meanings defined below:

Dimension:

A dimension is a structural attribute that is a list of members, all of which are of similar data type in the users' perception. For example all continents, countries, cities make up a geography dimension. A dimension acts as an index for identifying values within a multi-dimensional array.

Dimension Members:

A dimension member is a discrete name or identifier used to identify a data items position and description within a dimension. For example, January, or the first quarter of 1993, are typical examples of members of the Time dimension.

Cell/Datapoint:

A single data-point that occurs at the intersection defined by selecting one member from each dimension in a multidimensional array (database).

Multi-dimensional Array (Database):

A group of data cells arranged by the dimensions of the data. For example, a spreadsheet exemplifies a two-dimensional array with the data cells arranged in rows and columns, each being a dimension. A three-dimensional array can be visualized as a cube with each dimension forming a side of the cube, including any slice parallel with that side. Higher dimensional arrays have no physical metaphor, but they organize the data in the way the users think of the enterprise. Typical enterprise dimensions are time, products, geographical regions, sales channels, etc. Also referred to as a multi-dimensional cube.

Measurement:

Values stored for each cell in a multi-dimensional array. Each cell may store one or more measurements. For example quantity, profit, prices.

Hierarchy:

Any dimension's members may be organized based on parent-child relationships, typically where a parent member represents the consolidation of the members which are its children. The result is a hierarchy, and the parent/child relationships are hierarchical relationships. For example, hierarchy related to time dimension may be days, aggregated to weeks, months etc.

Drill Down/Up:

Drilling down or up is a specific analytical technique whereby the user navigates among levels of data ranging from the most summarized (up) to the most detailed (down). The drilling paths may be defined by the hierarchies within dimensions or other relationships that may be dynamic within or between dimensions. For example, when viewing sales data for North America, a drill down operation in the Region dimension would the display Canada, the Eastern United States and the Western United states.

Rotation:

Rotation is the process whereby the dimensions, which are to be displayed together in a view, are chosen.

Selection:

A selection is a process whereby a criterion is evaluated against the data or members of a dimension in order to restrict the set of data retrieved.

Slice and Dice:

The user-initiated process of navigating by calling different displays interactively, through the specification of views via rotation, selection, dimension member scoping and drill down/up.

OLAP Server:

An OLAP server is a data manipulation engine specifically designed to support and operate on multi-dimensional data structures. A multi-dimensional structure is arranged so that every data item is located and accessed based on the intersection of the dimension members, which define that item. The design of the server and the structure of the data are optimized for rapid ad-hoc information retrieval in any orientation, as well as for fast, flexible calculation and transformation of raw data based on formulaic relationships.

OLAP User Application:

End user applications that can request slices from OLAP servers and provide two-dimensional or multi-dimensional displays, user modification, selections, ranking, calculations, etc., for visualization and navigation purposes.

Legacy System:

Transaction based database systems (usually implemented on relational database technology) that tracks and stores operational data, allowing modifications of the input and the output from the database.

The invention is directed to a method for the interactive graphical presentation of multidimensional data to a user. Data is extracted from an n dimensional accessible database, arranged and stored according to predetermined data attributes. The attributes represent different measures for each dimension. A data processing means coupled to said database, is used for extracting data from the database and for processing the extracted data for a predetermined presentation. The data processing means comprises a user interface for communicating with the user and a display for displaying the presentation to the user. Upon receiving a request for presentation from the user, data which is relevant to the request is extracted from the corresponding dimension (s) in the database, process by the processing means and displayed in two or more separate windows linked to each other. Each window corresponds to a single dimension and contains comparative presentation of the data related to this single dimension. The comparative presentation in each window contains one or more visual parameter(s), such as colored bars, used by the user as comparative measurement of displayed data, relative to other displayed data. Preferably, each dimension comprises one or more members, and each data point in the database is determined by the combination of individual members, or by values representing a combination or a transformation of a plurality of individual members with a dimension. Each individual member value is selected from a different dimension.

Preferably, the processing means may be software installed in a workstation, or a processing circuitry. The interface to the user may be a mouse and/or a keyboard, connected to a workstation.

The length and/or color of each bar is related to the length and/or color of all other bars in the window, over a predefined color scale. Preferably, user-controllable visual selection means for one or more visual parameters are provided to the user, for displaying data dimensions relevant to one or more selected parameters. Upon selecting one or more visual parameter in a window, all other visual parameters in said window are disselected, and the presentation is updated with data dimensions relevant only to the selected visual parameter(s).

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
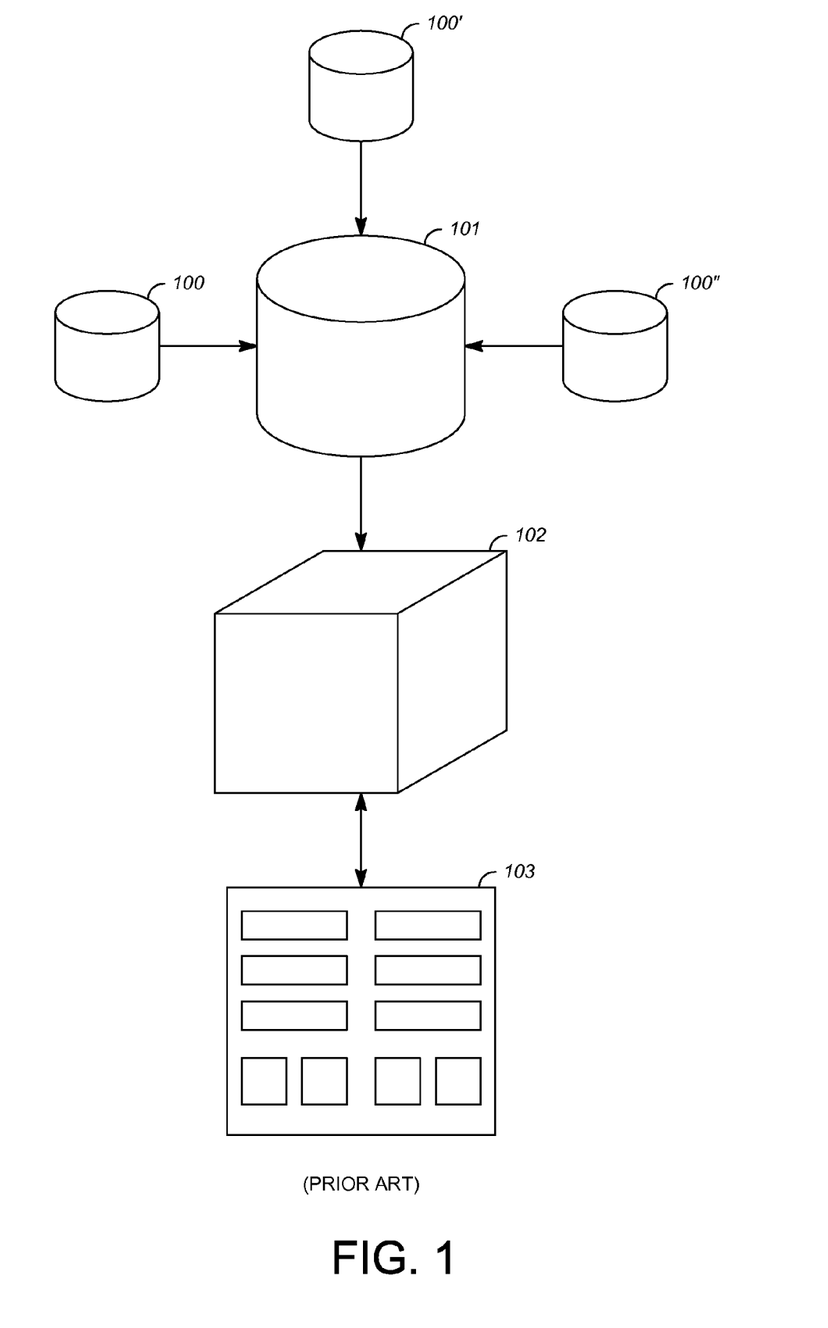
FIG. 1 schematically illustrates data flow from several databases to an OLAP front-end interface, which renders extracted and processed data to an OLAP user.

FIG. 1 schematically illustrates data flow from several databases to an OLAP front-end interface, which renders extracted and processed data to an OLAP user. Data is stored in one or more databases 100–100", each of which is related to several legacy systems. The databases 100–100" are linked to a centralized data warehouse 101, which enables the warehouse 101 to access and retrieve data from all linked databases 100–100". The data warehouse 101 is linked to an OLAP server 102, which is also linked to an OLAP user 103, who wishes to view data stored in the databases 100–100". Upon receiving a request (a query) for data from the user 103, the OLAP server 102 extracts the required data from the relevant databases 100–100" through the data warehouse 101. Data is provided rapidly to the user's workstation, processed in the OLAP server 102 by suitable software (known to the skilled persons which is therefore not described herein in detail, for the sake of brevity), and supplied to the user according to predetermined presentation selected by him. Alternatively, data can be extracted directly from the warehouse 101 and stored in the OLAP database. In this case, the legacy systems are not accessed and therefore, the processing time is substantially shortened. Data extraction using a combined query (i.e., accessing the legacy systems to extract a portion of the required data) is also possible.

Figure 2:
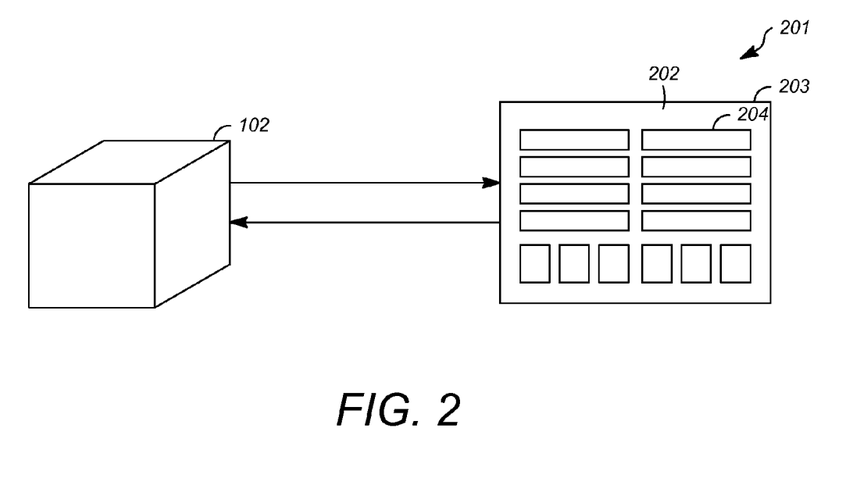
FIG. 2 schematically illustrates data exchange between an OLAP front-end interface and data presentation, according to a preferred embodiment of the invention.

FIG. 2 schematically illustrates data exchange between an OLAP front-end interface and data presentation, according to a preferred embodiment of the invention. At the first step, the user transfers a data request to the OLAP server 102, via a graphical interface 201, which may be, for example, a workstation with graphical color display. At the next step the OLAP server extracts the required data from the databases and returns the extracted data to the graphical interface 201. The aggregated and consolidated data, provided by an OLAP server 102, is processed by the graphical interface 201 (by performing predetermined summations of the relationship between displayed dimensions), and presents the outcome graphically to the user, as a graphical image 202 which comprises a portion or all of the required information. The displayed image also functions as an interface for further investigation of the data. The displayed image 202 allows the user to interactively change display formats by performing slice and dice, drill up/down, and scoping operations of the extracted data. These operations require further queries which are sent from the user to the OLAP server 102, which in turn supplies the new data to the interface 201. The final graphical display presentation comprises colored bars 203, each of which represents a summation result based on relationships between the dimensions that are currently displayed.

According to a preferred embodiment of the invention, the representation comprises several windows, each window consists of the colored bars 203, which represent members of one dimension. Each bar uses both length and color to display two different measurements. The color and length of each bar representing the two measurements are calculated in relation to all the members in the remaining windows (dimensions).

Single-Layer Static Presentation

According to a preferred embodiment of the invention, a static presentation is displayed to the user when examining single-layer data. The view results from comparison between two or more dimensions and two or more measurements. For the sake of simplicity, a three dimensional model with two measurements is described.

The set of data for presentation comprises two different dimensions of comparison, the dimension of time, and two measurement values, which correspond to these two dimensions. Each dimension is represented in its own window. Each window consists of bars, whose combination of length and color represents the measurements. The essence of this presentation is in the underlying linking that connects the windows. This unique linking advantageously expands the analytical capability of the data, since it allows for a meaningful representation of more than two dimensions, and information which lies in the relationship between the dimensions.

Figure 3:
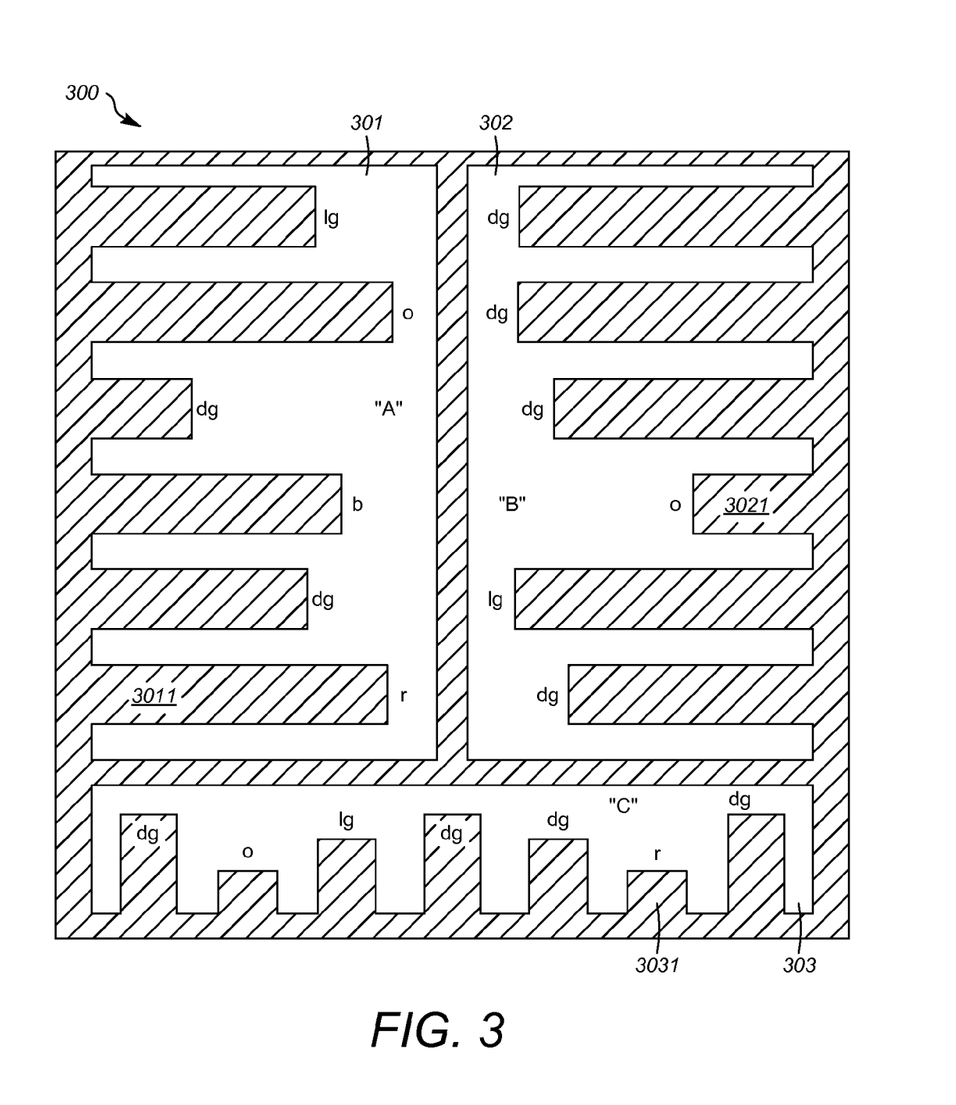
FIG. 3 schematically illustrates a presentation of a data set, according to a preferred embodiment of the invention.

Student achievements are taken as an exemplary data set, as shown in the presentation display of FIG. 3. The three dimensions that are compared are students, learning material and time. In this example, the amount of material completed is the first measurement, and the grade that is given to each student per question is the second measurement.

The basic view 300 of FIG. 3 is composed of three windows, 301, 302 and 303, each of which represents a dimension in the comparison of this single example. Each window contains a graphical display of bars, where each bar represents the two measurements per member in the specific dimension.

Window 301 "Dimension Window A" (hereinafter referred to simply as "Window A") displays the students dimension. In this window each individual bar represents an individual student. Window 302 "Dimension Window B" (hereinafter referred to simply as "Window B") displays the learning material dimension. In this window each bar represents a question. In the third dimension, shown in Window 303, time is represented in the "Time Line" where each bar represents a specific day (date).

The length of a bar in Window 301 is determined by the amount of items in Window 302, for which the specific item has a record entered during the period specified in the Time-Line. In this window, the length of a bar representing a student is determined by the amount of questions the students has answered during the designated period.

The length of each bar in Window 302 is similarly calculated. The length of each specific bar in Window 302 is determined by the amount of items in Window 301 for which the specific item has a record in the data set entered during the period designated by the Time Line. In this window, the length of a bar representing a single specific question is determined by the number of students who have completed the question (i.e. for which a grade is entered in the data set) during the designated period.

Looking at Window 303, the height (length) of each time bar is calculated as the number of entries for the particular time unit, for all items in Window 301 and Window 302. In this window, the height of each bar represents the number of questions which appear in Window 302, that are solved by students which appear in Window 301, on the specific day which corresponds to that bar.

Any change in data affects all windows. A change in any window is reflected in all other window. The same applies td any change in the Time Line of Window 303. Thus, even though the Windows 301 to 303 in this example may seem to be separated, they are, in fact, bound together.

A bar can be of any color, e.g., in the spectrum ranging from red through green. The color of each bar represents the second measurement in the data set of the example. The green color represents the highest measurement (100%) and the red color represents the lowest measurement (0%).

The color of a bar in Window 301 represents the average measurement for the specific item calculated over all the items in Window B during the period specified by the Time Line. The bar of a student in Window 301 represents the average of the grades for all the questions appearing in Window 302 for which the student has an entry in the data set. Thus the color represents his average grade over the specified period.

Similarly to the calculation of length, the calculation of color in Window 302 is carried out exactly the same as for Window 301, but based on the values in Window 301 during the time period designated by the Time Line in window 303. The color of a bar in Window 302 represents the average of the measurement for the item calculated over all the items in Window 301. In this example, the color of a bar for a specific question represents the average of all the grades achieved by the students in Window 301 who has completed the question during the designated period. The color of the bar is derived from the average of the values for all the entries (both sides) on that particular time unit. Returning to the example, the average grade achieved on the questions appearing in Window 302 by the students appearing in Window 301 on the particular day. The same linkage between the Windows for the calculation of the lengths of bars, also exists for the calculation of the color of bars. Thus every change in the data set affects all Windows.

The representation for a data set containing three dimensions (A, B, and time T), and two measurements (length and color) is defined as follows:

A is the set of members of dimension A (displayed in Window 301).

B is the set of members of dimension B (displayed in Window 302).

T is the set of members of the time dimension (displayed in the Time Line window 303).

(a, b, t) is a cell (a∈A, b∈B, t∈T).

L(a, b, t) is the length measurement for that cell.

C(a, b, t) is its color measurement.

The length of a bar in Window 301 which represents the member a is calculated as:

$$L(a) = \sum_{b \in B, t \in T} L(a, b, t)$$

The color of a bar in Window 301 which represents the member is calculated as:

$$C(a) = \underset{b \in B, t \in T}{Avg} C(a, b, t)$$

Averaging is only an example for calculation of comparative measures. Additional calculation methods for comparative measures may be used as well. For example, the calculation may be arithmetic averaging, simple summation, maximization functions over the data sets, etc.

The length of a bar in Window 302 which represents the member b is calculated as:

$$L(b) = \sum_{a \in A, t \in T} L(a, b, t)$$

The color of a bar in Window 302 which represents the member b is calculated as:

$$C(b) = \underset{a \in A, t \in T}{Avg} C(a, b, t)$$

The length of a bar in the Time Line (Window 303) which represents the member t is calculated as:

$$L(t) = \sum_{a \in A, b \in B} L(a, b, t)$$

The color of a bar in the Time Line (Window 303) which represents the member t is calculated as:

$$C(t) = \underset{a \in A, b \in B}{Avg} C(a, b, t)$$

The unique linkage between Windows 301 to 303, together with the use of color and length as measurements, outline key relationships, which are buried within the data and which would otherwise be difficult to notice.

The innovative display method for viewing multidimensional data, according to the present invention, allows for the quick identification of problematic points. Looking back at the above example, three powerful views may be obtained from the data sets.

Looking first at Window 301 in FIG. 3 above, the student represented by the bottom bar encounters more problems with the learned material, compared to the other students the class. His bar 3011 is longer than other bars in window 301. Thus, he has completed more questions. Furthermore, the color of his bar 3011 is closer to red than any other bar in Window 301. The color provides a further indication, that he has completed the question with a poor average grade as well. In FIG. 3, the following letters define the represented colors:

"lg": light green;
"o": orange;
"dg": dark green;
"b": blue;
"r": red;

Looking at Window 302, the third question from the bottom in the data set seems to be problematic. Even though several students have completed the question as seen from the length of the bar 3011, most students have not succeeded to answer the question, as indicated by the red color of bar 3021. The inference that arises from the presentation indicates that the students represented in Window 301 do not master specific material, associated with a specific question.

Looking at the "Time Line" Window 303, the bar most remarkable bar is the sixth bar from the left 3031, representing Saturday. The bar 3031 is shorter and closer to red than the rest of the bars in the window. The color provides a further indication, that the material learned on Saturday was problematic.

Each of theses indications can be analyzed and understood (e.g., it is possible that a substitute teacher taught the material on Saturday, or that a specific topic should be learned again differently). The presentation quickly identifies problematic key points hidden in the data. The underlying linkage allows to discover issues and problems in each analyzed dimension, and the relationships between them.

Dynamic Presentation

According to a preferred embodiment of the invention, further information may be obtained by actively investigating the data rendered by the static presentation. The dynamic attributes of the view results from the underlying linkage between the three windows described above. Additional issues and key points hidden in the data can be rapidly reached by using dynamic investigation.

Looking again at FIG. 3 above, according to a preferred embodiment of the invention each bar contained in every Window may be either selected or not selected by the user. The length and color calculations of the measurements in the remaining Windows are performed with respect to the bars which are selected in a current Window. For the sake of clarity, selections are preferably, but non-limitatively, performed on one bar at a time. The unselected bars in the window remain visible and present the values calculated, based on the selected members in all the other windows. Using the dynamic presentation, the selected bars in each window affect the presentation of both selected and unselected bars in all other windows.

The static presentation indicates that the student's bar 3011 in the list is problematic, compared with the rest of the students in the class. This is derived from the length of the bar 3011, representing this student, which is significantly longer than the other bars. While the color of that bar is closer to red than the color of the other bars in Window 301. At this stage, the other Windows 302 and 303 in the view do not provide additional information related to this particular student. Both remaining windows 302 and 303 represent an average of all the other students either per question or by time. According to a preferred embodiment of the invention, by selecting the specific bar representing the weak student (e.g., by a mouse clicking or any other selection method, depending on the software implementation of the view) the remaining Windows 302 and 303 are updated with relevant information related to the selected student. This enables the user to investigate a problem, identified in the static presentation in further details, so as to reveal the weaker student.

After the selection is made in Window 301, the bars in Window 302 represent the achievement per question, only of the student selected in Window 301. Further examination reveals which particular questions (and thus, which associated topics) are difficult to the student. After selection, Window 302 shows that the bars representing the third and fourth questions were not completed successfully by this student (they are almost red). In addition, Window 302 shows that the last question was not even completed (its corresponding bar has no length). Thus, the dynamic presentation quickly identified not only the problematic student, but also the type of material causes the problem. The remaining unselected bars in Window 301 are visible and represent each of the students' achievements related to the questions and the time periods selected in Windows 302 and 303, respectively. The unselected bars may be rendered by dimming or any other visible modification.

The selection also updates Window 303 which contains time bars representing the selected students' achievements on each particular day.

In order to identifying the problematic student and the problematic material, it is possible to discover when this material has been learned (the questions completed) and on which days the student had problems with the material. More findings regarding the problem being investigated are obtained by the selection. In the above example, it can be seen that on Saturday the student did not complete any questions successfully. Hence, the problematic material designated in Window 302, which was learned on that day, is the problematic point of this particular student. More relevant facts can lead to other plausible scenarios (e.g., the student missed the lesson on that particular day, etc.).

In a similar way, a specific bar in any available window can be selected. By selecting a bar in a window, the remaining windows are updated accordingly and present data which is relevant to the selected item. Normally, the selection is made by the user according to the initial view, and to the most remarkable problematic point.

According to a preferred embodiment of the invention, if in the initial view of the data a question in Window 302 is accentuated (i.e., a problem is identified, compared to the rest of the questions), the question is selected to start the investigation. Once the bar representing the problematic question is selected, the remaining two windows are updated so that they represent data pertinent to the selected question. The updated student window (Window 301) will contain bars representing the grade that were given to each student for the selected question. A bar with no length indicates that the student has not completed the question. The Time Line represents the achievements related to the selected question per day. The new view reveals details about the problematic question. For example, an indication that a different teacher taught the material related to the selected question (based on the day the question was answered) may be obtained. A specific group of students who had difficulty with the learned material may be discovered. Therefore, the relationships between the windows in the view enables to investigate and quickly find key points of dissonance in the data set. By actively selecting accentuated bars based on one or more measurements, an intuitive perception and exploration may be rapidly obtained from the static view in any of the displayed three dimensions. This active presentation of data allows to easily explore complex data.

An improved definition of the view, which takes into consideration the selection process follows.

A is the set of members of dimension A (displayed and selected in Window 301).

B is the set of members of dimension B (displayed and selected in Window 302).

T is the set of members of the time dimension (displayed and selected in the Time Line window 303).

The length of a bar in Window 301 which represents the member a is calculated as:

$$L(a) = \sum_{b \in B, t \in T} L(a, b, t)$$

The color of a bar in Window A which represents the member a is calculated as:

$$C(a) = \underset{b \in B, t \in T}{Avg}\ C(a, b, t)$$

The definitions for B and T are similar.

According to a preferred embodiment of the invention, the presentation of data can be expanded to multilevel hierarchical data structures. Predefined hierarchical data can be presented to the user, or alternatively, the user can dynamically define data groups and levels. The data for each analyzed dimension can be organized in levels. Some equal dimensions may comprise multiple layers, while other dimensions may comprise single level. The static and active representation of data remains the same for hierarchical representation. It is possible to view and investigate multilevel data and drill down to reveal detailed explanations to accentuated problematic points that appear at the higher levels. In many cases, problematic points can not be-seen at lower hierarchy levels, but appear only at higher levels as products of their parts. In addition, comparing data at higher levels may be required and become easier than comparing data at the lowest level unit in each dimension.

Table 1 is a simple exemplary database for the achievements of two students related to answering two questions:

TABLE 1

|  | Student A | Student B | Average grade per question |
|---|---|---|---|
| Question 1 | 70 | 100 | 85 |
| Question 2 | 50 | 100 | 75 |
| Total average grade per student | 60 | 100 |  |

Prior art graphic presentation of the data in table 1 requires two-dimensional graphs:

A graph for presenting the grades 70 and 50 of student A;

A graph for presenting the grades 100 and 100 of student A;

A graph for presenting the average grades (85 and 75) for question 1 of students A and B, respectively;

A graph for presenting the total average grades (60 and 100) for students A and B, respectively.

Using the presentation of FIG. 3 above, the data of table 1 may be presented by two windows, 301 and 302. In the static presentation mode, Window 301 renders two bars, representing the total average grades (60 and 100) of Students A and B, respectively. Window 302 also renders two bars, representing the average grade (85 and 75) between the two students for questions 1 and 2, respectively. By selecting the bar of Student A in window 301 (switching to a dynamic presentation), the bars in Window 302 render the grades 70 and 50, which are the grades of Student A for questions 1 and 2, respectively. By selecting the bar of Student B in window 301 (switching to a dynamic presentation), the bars in Window 302 render the grades 100 and 100, which are the grades of Student B for questions 1 and 2, respectively. The color of each bar provides additional comparative visual information, related to the rendered grade with respect to the color scale.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

The invention claimed is:

1. A computer-implemented method for a graphical presentation of multidimensional data to a user, comprising:
    a) providing a data set of dimension n containing data, the data having predetermined data attributes;
    b) for each of the dimensions, generating a plurality of comparative visual scales from at least some of the data attributes associated with the other dimensions; and
    c) displaying the visual scales in a plurality of separate windows;
    d) wherein the displayed windows are linked to each other so that a change in the data set is concurrently reflected in all of the displayed windows;
    e) wherein each of the displayed windows corresponds to a single dimension, the comparative visual scales therein being a comparative presentation that relates to the single dimension and contains one or more visual parameter(s) perceivable by the user as comparative measurements of displayed data relative to other displayed data;
    f) wherein each dimension comprises a plurality of members and each of the visual scales therein corresponds to one of the members thereof; and
    g) wherein the one or more visual parameter(s) for each of the visual scales in each of the dimensions is determined for the corresponding member by a combination or a transformation of at least some of the data relating to the corresponding member from the other dimensions.

2. A method according to claim 1, wherein the one or more visual parameter(s) for each of the visual scales in each of the dimensions is calculated according to a predetermined mathematical function.

3. A method according to claim 1, wherein the one or more visual parameter(s) for each of the visual scales in each of the dimensions are colored bars having respective lengths and colors, the lengths and colors of the bars within each of the displayed windows being comparative.

4. A method according to claim 3, wherein the lengths of the bars in each of the displayed windows is determined according to a respective predefined mathematical function of length.

5. A method according to claim 3, wherein the colors of the bars in each of the displayed windows is determined according to a respective predefined mathematical function of color.

6. A method according to claim 1:
    h) wherein the displaying step comprises displaying the visual scales in an interactive user interface having a user-controllable visual selection means;
    further comprising:
    i) selecting at least one of the visual scales in response to the selection means; and
    j) updating the visual scales in at least some of the windows other than the window containing the selected visual scale with information relevant to the member corresponding to the selected visual scale.

7. A method according to claim 6, further comprising:
    k) rendering the other visual scales in the window containing the selected visual scale as being unselected.

8. A method according to claim 7, wherein the rendering step comprises dimming or marking the unselected visual scale(s).

9. A method according to claim 7, wherein the rendering step comprises changing a font or a font characteristics of a name or designation of the member corresponding to the selected visual scale.

10. A computer-implemented method for an interactive graphical presentation of multidimensional data to a user, comprising:
    a) providing a data set of dimension n containing data, each of the dimensions comprising one or more members and the data being arranged and stored according to predetermined data attributes;
    b) providing a data processing means for extracting data from the data set and for processing the extracted data for a predetermined presentation, the data processing means having a user interface for communicating a suitable display for displaying the presentation to said user;
    c) upon receiving a request for the presentation from the user, extracting data relevant to the request from the corresponding dimensions in the data set and processing the extracted data by said processing means;
    d) for each of the dimensions, generating one or more comparative visual scales by processing the extracted data associated with the others of the dimensions;
    e) using the one or more comparative visual scales for displaying the processed data in two or more separate windows, linked to each other, so that a change in the processed data is concurrently reflected in all of the displayed windows, each of the displayed windows corresponding to a single one of the dimensions and containing a comparative presentation of the data related to the members of the single dimension, the comparative presentation in each of the windows containing one or more visual parameter(s) useful to the user as comparative measurement(s) of displayed data for the members thereof;
    f) providing user-controllable visual selection means for selecting one or more members in one of the windows; and
    g) upon selection of one or more members in the one window by the selection means, unselecting all other members therein, and updating the presentation of data dimensions relevant only to the selected visual parameter(s);
wherein each of the data in said data set is determined for a combination of individual members;
wherein the visual parameters for one of the dimensions are determined from a combination or a transformation of a plurality of individual member values associated with others of the dimensions;
wherein the visual parameters are colored bars, the length or color of the bars in each of the windows being comparative with one another; and
wherein the color of each bar in a window is determined according to a predefined mathematical function of color over a predefined color scale.

11. The method of claim 10 wherein:

the presentation of the unselected member(s) in a dimension is carried out by modifying the presentation of bar(s) associated therewith, the modification being carried out by dimming or marking the unselected bar(s).

12. The method of claim 10 wherein:

the presentation of the unselected member(s) in a dimension is carried out by modifying the presentation of the bar(s) associated therewith, the modification being carried out by changing a font or a font characteristic of a name or designation of the unselected member(s).

* * * * *